H. R. RAUB.
Gate.
No. 80,220.
Patented July 21, 1868.
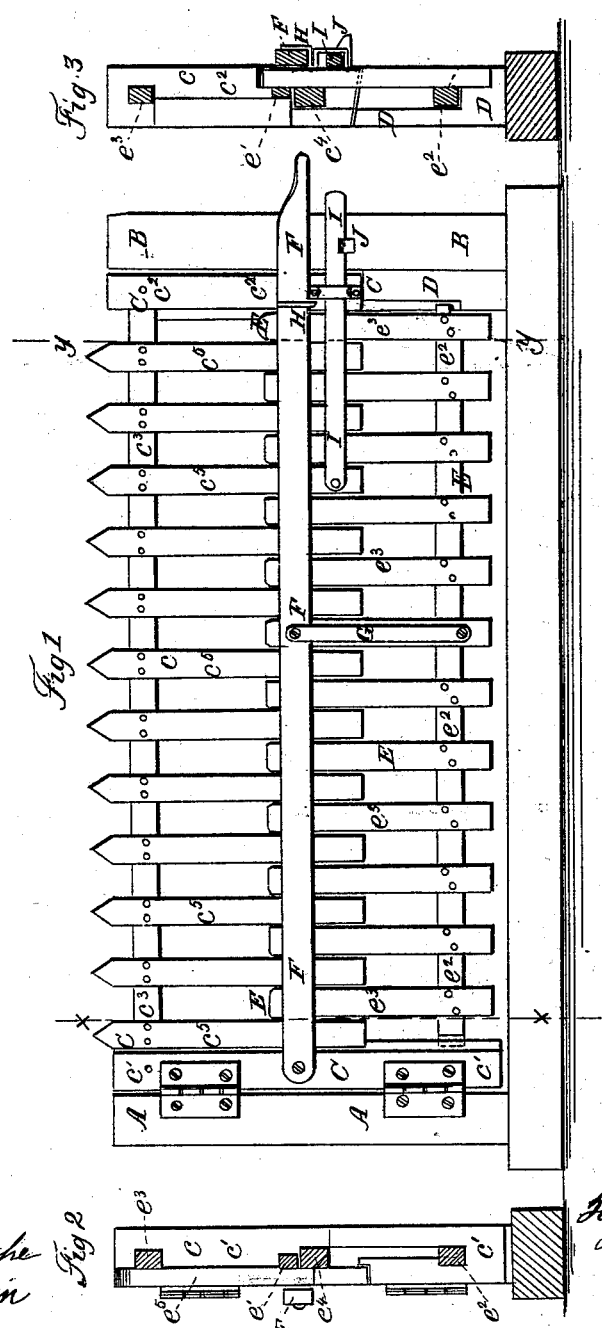
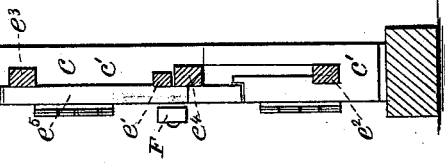

United States Patent Office.

HENRY R. RAUB, OF PYMATUNING, PENNSYLVANIA.

Letters Patent No. 80,220, dated July 21, 1868.

---

IMPROVEMENT IN GATES.

---

*The Schedule referred to in these Letters Patent and making part of the same.*

---

TO ALL WHOM IT MAY CONCERN:

Be it known that I, HENRY R. RAUB, of Pymatuning, in the county of Mercer, and State of Pennsylvania, have invented a new and useful Improvement in Gates; and I do hereby declare that the following is a full, clear, and exact description thereof, which will enable those skilled in the art to make and use the same, reference being had to the accompanying drawings forming part of this specification, in which—

Figure 1 is a side view of my improved gate.

Figure 2 is a vertical detail section of the same, taken through the line $x\,x$, fig. 1.

Figure 3 is a vertical detail section of the same, taken through the line $y\,y$, fig. 1.

Similar letters of reference indicate corresponding parts.

My invention has for its object to furnish an improved gate, so constructed and arranged that the lower part of the gate may be raised up, so that the gate may swing over snow or other obstructions, and so that hogs, sheep, &c., can pass through while larger stock cannot; and it consists in the combination of the sliding and stationary parts of the gate with each other, and in the combination of the lever and connecting-bar with the sliding and stationary parts of the gate, the whole being constructed and arranged as hereinafter more fully described.

A is the rear or hinge-post, and B is the front or catch-post.

C is the main or stationary part of the gate, the rear vertical bar $c^1$ of the frame of which is hinged to the post A.

$c^2$ is the front vertical bar of the gate, which is made short, and with its lower end inclined to fit upon the inclined upper end of the block D, which forms a continuation of the bar $c^2$, and is securely attached to the post B.

$c^3$ is the upper, and $c^4$ is the lower horizontal bar of the gate, the ends of which are secured to the vertical bars $c^1$ and $c^2$, and to which the pickets $c^5$ are attached, the lower ends of which, in an ordinary-sized gate, should be about two feet from the ground.

E is the lower or sliding part of the gate.

$e^1$ is the upper horizontal bar of said part, which is placed above the lower horizontal bar $c^4$ of the part C, and $e^2$ is the lower horizontal bar, the rear end of which enters and slides up and down in a groove formed in the rear vertical bar $c^1$ of the part C, and its forward end enters and slides up and down in a groove formed in the block D, and continued up into the front vertical bar $c^2$ of the said part C.

$e^3$ are the pickets, which are attached to the bars $e^1$ and $e^2$, in such positions that they may slide up and down between the pickets $c^5$ of the part C.

The front side of the block D is cut away, as shown in figs. 1 and 2, and the shoulder thus formed is inclined, to serve as a catch for the forward end of the bar $e^2$.

F is a lever, the rear end of which is pivoted to the rear vertical bar $c^1$ of the part C, and the middle part of which is connected to the sliding part E by the connecting-bar G, so that the said sliding part may move up and down vertically, when operated by the said lever.

When the sliding part E is down, the forward end of the lever F rests upon a square hook, H, attached to the front vertical bar $c^2$ of the part C.

I is a latch, the rear end of which is pivoted to the part C, and which latches upon a catch, J, attached to the post B.

For additional security, the forward end of the lever F may also latch upon a catch attached to the said post B.

By raising the forward end of the lever F, the part E will be slid up into the part C, so that the gate may swing freely over snow or other obstructions; and by securing it in a raised position, hogs, sheep, and other small stock can pass freely through, while the passage of larger stock will be prevented.

I claim as new, and desire to secure by Letters Patent—

1. The combination of the sliding part E and stationary part C of the gate, with each other, substantially in the manner herein shown and described, and for the purpose set forth.

2. The combination of the lever F and connecting-bar G with the stationary part C and sliding part E of the gate, substantially as herein shown and described, and for the purpose set forth.

The above specification of my invention signed by me, this 27th day of April, 1867.

HENRY R. RAUB.

Witnesses:
JAMES HENDRY,
PETER HENDRY.